United States Patent
Bywaters et al.

(10) Patent No.: US 7,119,453 B2
(45) Date of Patent: Oct. 10, 2006

(54) DIRECT DRIVE WIND TURBINE

(75) Inventors: Garrett Bywaters, Waitsfield, VT (US); William Danforth, Rochester, VT (US); Christopher Bevington, Waitsfield, VT (US); Stowell Jesse, Warren, VT (US); Daniel Costin, Chelsea, VT (US)

(73) Assignee: Northern Power Systems, Inc., Waitsfield, VT (US)

(*) Notice: Subject to any disclaimer, the term of this patent is extended or adjusted under 35 U.S.C. 154(b) by 0 days.

(21) Appl. No.: 11/276,869

(22) Filed: Mar. 17, 2006

(65) Prior Publication Data

US 2006/0152015 A1     Jul. 13, 2006

Related U.S. Application Data

(62) Division of application No. 10/709,176, filed on Apr. 19, 2004, now Pat. No. 7,075,192.

(51) Int. Cl.
*F03D 11/00* (2006.01)

(52) U.S. Cl. .......................... 290/55; 290/44
(58) Field of Classification Search ............... 290/43, 290/44, 54, 55
See application file for complete search history.

(56) References Cited

U.S. PATENT DOCUMENTS

| | | | | |
|---|---|---|---|---|
| 4,291,233 A * | 9/1981 | Kirschbaum | ............... | 290/1 C |
| 4,316,699 A * | 2/1982 | Schott et al. | ............... | 416/139 |
| 4,357,542 A * | 11/1982 | Kirschbaum | ............... | 290/44 |
| 6,285,090 B1 | 9/2001 | Brutsaert et al. | | |
| 6,400,039 B1 * | 6/2002 | Wobben | ............... | 290/44 |
| 6,452,287 B1 | 9/2002 | Looker | | |
| 6,541,877 B1 * | 4/2003 | Kim et al. | ............... | 290/44 |
| 6,998,729 B1 * | 2/2006 | Wobben | ............... | 290/54 |
| 7,057,305 B1 * | 6/2006 | Kruger-Gotzmann et al. | | 290/55 |
| 2003/0071469 A1 * | 4/2003 | Becker | ............... | 290/55 |
| 2003/0194310 A1 | 10/2003 | Canini et al. | | |
| 2004/0041409 A1 | 3/2004 | Gabrys et al. | | |

FOREIGN PATENT DOCUMENTS

| | | |
|---|---|---|
| BE | 902092 | 7/1985 |
| DE | 261395 A1 | 10/1988 |
| DE | 4402184 A1 | 8/1995 |
| DE | 10102255 A1 | 8/2001 |
| EP | 0037002 A1 | 3/1981 |
| EP | 0811764 B1 | 5/2000 |
| EP | 1371845 A2 | 12/2003 |
| ES | 2156706 A1 | 9/1999 |
| WO | 20070219 A | 11/2000 |
| WO | 200121956 A1 | 3/2001 |
| WO | 2002057624 | 7/2002 |
| WO | 2003023943 A2 | 3/2003 |

OTHER PUBLICATIONS

Chen et al., "A Variable-Speed, Permanent-Magnet, Wind-Turbine Generator and its Control"Power Engineering Confernece vol. 2,Sep. 1995 pp. 517-520.
Jefferson et al., "The Application of Flywheels in Short-Term Energy Storage", Alternative Energy Systems, Electrical Integration and Utilization Conference, Sep. 1984, pp. 97-104.

* cited by examiner

*Primary Examiner*—Nicholas Ponomarenko
(74) *Attorney, Agent, or Firm*—Dave S. Christensen

(57) ABSTRACT

A wind turbine is provided that minimizes the size of the drive train and nacelle while maintaining the power electronics and transformer at the top of the tower. The turbine includes a direct drive generator having an integrated disk brake positioned radially inside the stator while minimizing the potential for contamination. The turbine further includes a means for mounting a transformer below the nacelle within the tower.

19 Claims, 3 Drawing Sheets

DIRECT DRIVE WIND TURBINE

CROSS-REFERENCE TO RELATED APPLICATIONS

This application is a divisional application of U.S. Nonprovisional patent application Ser. No. 10/709,176 entitled "Direct Drive Wind Turbine" filed on Apr. 19, 2004 now U.S. Pat. No. 7,075,192.

FEDERAL RESEARCH STATEMENT

This invention was made with Government support under contract DE-FC36-03GO13131 awarded by the Department of Energy. The Government has certain rights in this invention.

FIELD OF INVENTION

This disclosure relates generally to wind turbine and especially to wind turbines with a direct connection between the turbine and the electrical generator.

BACKGROUND OF THE INVENTION

The wind has historically been one of the most widely used natural resources to provide the energy necessary to power our needs. As the demand for energy has increased and the supplies of fossil dwindled, resulting there has been a renewed look by electrical utility companies at alternative methods for producing electrical power. One method of electrical production involves the harnessing of the wind by a wind turbine to drive an electrical generator.

Wind turbines typically involve using a series of blades fixed to the top of a tower to rotate about a horizontal axis. The blades have an aerodynamic shape such that when a wind blows across the surface of the blade, a lift force is generated causing the series of blade to rotate a shaft about an axis. The shaft is connected, typically via a gearing arrangement, to an electrical generator located in a structure called a nacelle which is positioned behind the blades. The gear box converts the rotation of the blades into a speed usable by the generator to produce electricity at a frequency that is proper for the electrical grid it is providing power.

The nacelle houses a number of components which are needed in modern high capacity wind turbines. In addition to the aforementioned gear box and generator, other components include a yaw drive which rotates the wind turbine, various controllers, and a brake that is used to slow the generator. Since it is desirable to keep the nacelle as small as possible, and given the number of relatively large pieces of equipment which must be located in the nacelle, space becomes very valuable. This often results in difficulties in both manufacturing the wind turbine and in conducting maintenance operations in the nacelle once the wind turbine is installed.

Accordingly, it is considered desirable to provide a wind turbine which minimizes the size of the nacelle while providing adequate accessibility to components during maintenance operations.

SUMMARY OF THE INVENTION

A wind turbine is provided that includes a nacelle with a rotor hub adjacent thereto. The turbine has a main shaft coupled to the hub and the nacelle. A generator is coupled to the shaft between the nacelle and the hub, wherein the generator includes rotor adjacent to the shaft. Also a stator is positioned adjacent to and radially outward from the rotor and, a brake is coupled to the generator and the shaft, such that the brake is positioned radially inward from said stator.

A wind turbine is also provided including a tower having a yaw bearing attached at one end. A nacelle having a bedplate is connected to the yaw bearing and a transformer is positioned within the tower opposite the nacelle. In a first alternate embodiment, the transformer is suspended by a chain. In a second alternate embodiment, the transformer is suspended in a viscous fluid in a container connected to the tower.

A wind turbine is further provided having a nacelle and a blade rotor hub adjacent to the nacelle. A main shaft is coupled to the blade rotor hub and the nacelle. Also a generator is coupled to the shaft between the nacelle and the hub, the generator having a housing containing a generator rotor adjacent to the shaft and a stator positioned adjacent to and radially outward from said rotor. A cylindrical roller bearing is coupled between the shaft and the housing adjacent to the nacelle. A second bearing is coupled between the shaft and the housing adjacent to the hub.

Also, a method for transferring electrical power from a wind turbine is provided including the steps of rotating blades using wind. Rotating a generator and generating electricity with the generator. Supporting the generator with a tower and suspending a transformer adjacent to the generator. Damping the movement of the tower by contacting the transformer and transmitting the electricity through the transformer.

The above discussed and other features will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike.

DESCRIPTION OF PREFERRED EMBODIMENT

Electrical power may be generated by many different methods. The most common methods involve the boiling of water using fossil or nuclear based fuels. The steam produced by the boiling is used to rotate a turbine that drives an electrical generator to create the electrical power. While these common methods are very efficient, they also have undesirable side effects, such as the production of toxic pollutants, or the rely on a dwindling natural resource. One alternate method of creating electrical power is to harness a renewable natural resource such as the wind to be a driving force to rotate the electrical generator to produce the electricity.

Figure 1:
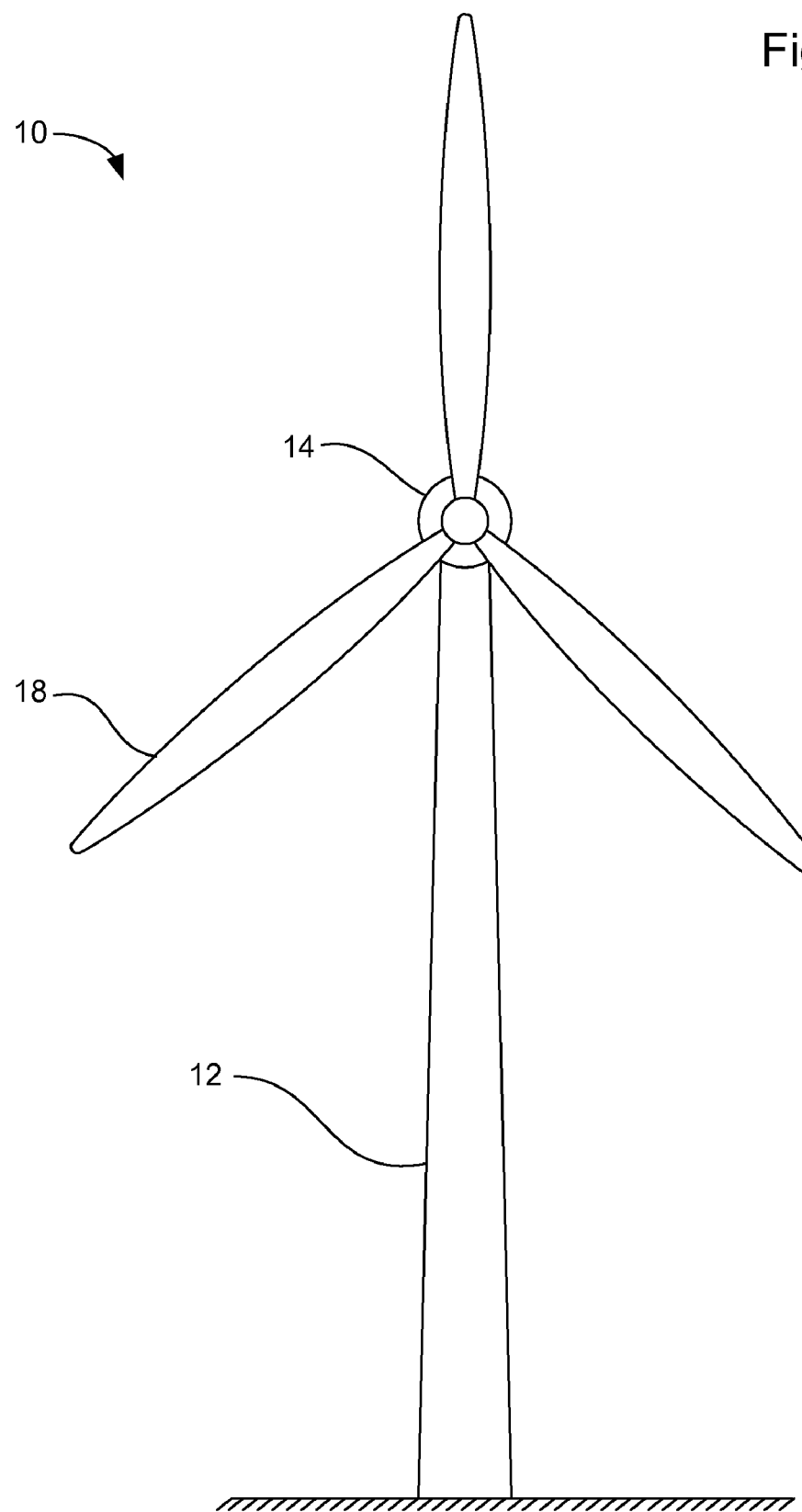
FIG. 1 is a plan view illustrating a direct drive wind turbine of the present invention.
Figure 2:
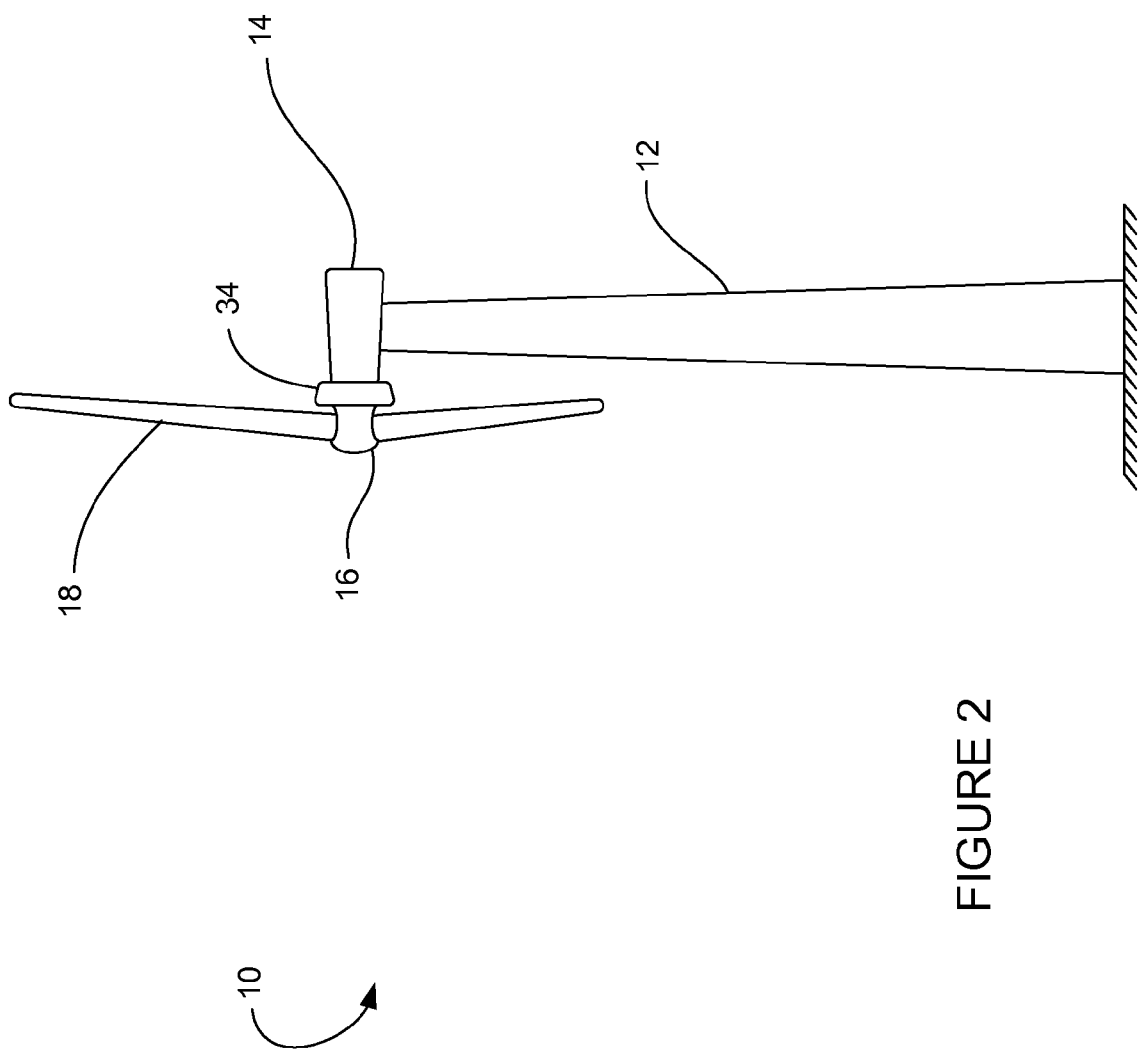
FIG. 2 is a side plan view of the wind turbine of FIG. 1.

Referring to FIG. 1 and FIG. 2, a wind turbine 10 capable of generating electrical power in the 100 kw to 2000 kW range is shown. The wind turbine 10 is includes a tower 12 which is anchored to the ground by means of a bolted connection to a steel and concrete foundation. On the opposing end of the tower 12, the nacelle 14 is mounted to rotate about the tower 12 to allow the nose cone 16 and the plurality of blades 18 to face into the wind. As will be described in more detail herein, a generator 20 is positioned between the nose cone 16 and the nacelle which allows the size of the nacelle to be minimized while still allowing all the necessary power electronics and controls to located either in the nacelle 14 itself, or adjacent the top of the tower 12.

Typically for this size turbine, the tower 12 is between 20 and 100 meters in height and constructed of tapered tubular steel of up to 4 meter diameter at the ground and 1–2 meter diameter at the top. The tapered tubular steel tower is constructed in sections to facilitate the transportation and assembly of the wind turbine 10 at its point of use. Alternatively, the tower may be made from a lattice structure or from concrete sections. In the preferred embodiment, there are three turbine blades 18 of 10–45 meters in length that equally spaced around the nose cone 16. While the blades may be made of any suitable material, typically a glass fiber reinforced plastic or epoxy is used to reduce weight while still providing the necessary mechanical strength required to withstand the wind loads. To reduce the complexity of the wind turbine 10 the blades 18 are preferably of a fixed pitch type, though variable pitch blades could also be used as well.

Figure 3:
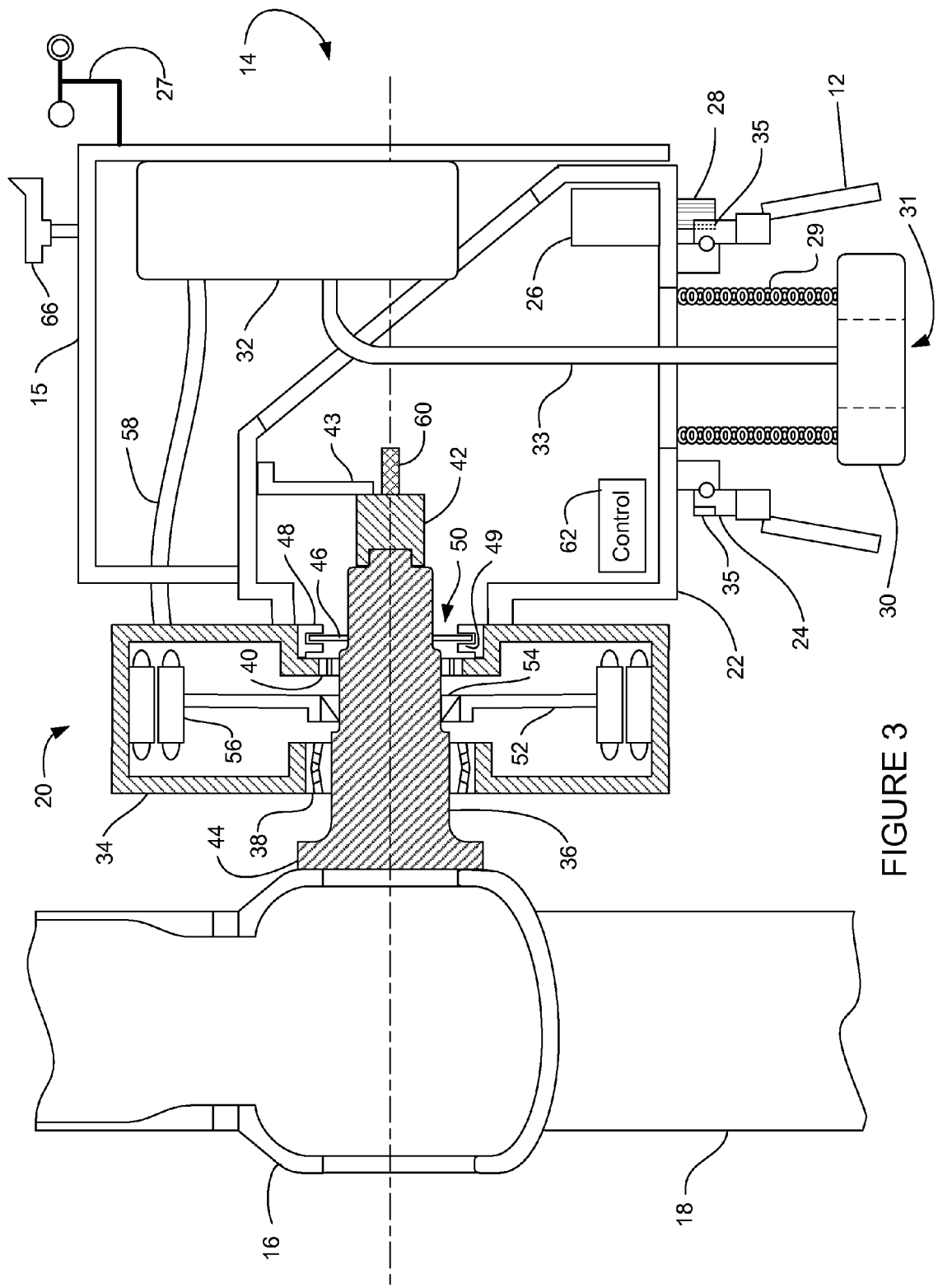
FIG. 3 is a side plan view, partially in section of the wind turbine of FIG. 1.

Turning to FIG. 3, the nacelle 14 and generator 20 will be described in more detail. The nacelle 14 has a bedplate 22 which forms the floor of the nacelle 14 and a cover 15 which encloses the bedplate 22. The bedplate 22 is mounted to a yaw bearing 24 that is mounted a top the tower 12. The yaw bearing 24 allows the nacelle 14 to rotate relative to the tower 12 to allow the blades 18 to orient correctly relate to the wind ensuring maximum energy production. A yaw drive 26 mounted inside the nacelle 14 drives a pinion 28 which interacts with gear teeth 35 on the outer race of yaw bearing 24 to provide the necessary force to rotate the structure. The controller 62 receives information on the wind direction from a wind sensor 66 which activates the yaw drive 26. The safety system of the wind turbine uses an anemometer 27. Whenever the wind speed exceeds a pre-determined safe value, the wind turbine shuts down. A typical wind speed for shut down is 25 meters/second. Since it is desirable to transfer the electrical power from the nacelle 14 to the grid at a high voltage to reduce the required cable size, in the preferred embodiment, a transformer 30 is suspended below the bedplate 22 inside the tower 12 by a chain 29. It should be appreciated that the transformer 30 may be mounted to the bedplate 22 by any suitable means, preferably a means that allows some flexure to compensate for vibratory movement of the wind turbine 10.

By arranging the transformer beneath the nacelle 14 inside the tower 12, the transformer 30 is allowed to rotate with the nacelle 14 while reducing the required size of the nacelle. Preferably, the transformer 30 will also have an opening 31 in the center to allow access to the nacelle 14 by maintenance personnel from within the tower 12. In an alternative embodiment, the transformer is sized to allow periodic contact between the transformer 30 and the tower 12 which will act to mechanically damp any oscillations of the tower which may occur. The transformer 30 may be of any electrical type suitable for a wind turbine, including both the dry-type and oil-filled, 3-phase Wye or 3-phase delta, high voltage or low voltage. In another alternate embodiment, the transformer is of a rectangular shape, and placed to one side in the tower 12 to allow access to the nacelle 14 by maintenance personnel. In another alternate embodiment, the transformer is suspended in a bath of viscous fluid that is attached to the tower 12 to provide viscous damping of any oscillations of the tower 12.

The transformer 30 connects via cable 33 to the power electronics 32 mounted inside the nacelle 14, typically on the cover 15. As will be described in more detail below, the power electronics 32 receives electricity from the generator 20 and converts the variable frequency electricity to match the frequency required by the electrical grid that wind turbine 10 is connected. For a typical application, the generator 20 produces at a frequency between 10–30 Hz and the power electronics 32 use conventional means to produce the frequency of the electrical grid, typically 50 Hz or 60 Hz. The power electronics 32 may utilize an intermediate conversion of alternating current ("AC") power from the generator to direct current ("DC") power before converting to AC power at the grid frequency. Power throughput and terminal power factor are adjustable via controller commands (not shown).

The generator 20 includes a housing 34 which is mounted to the bedplate 22. The housing 34 connects to a main drive shaft 36 through front bearing 38 and rear bearing 40. In the preferred embodiment, the front bear 38 is a double-tapered roller bearing sized to carry a majority bending moment and axial thrust generated by the blades 18. Alternatively, the front bearing 38 may be a crossed roller bearing or a three row type roller bearing. If the bearing 38 was required to support large bending moments by itself, the distance between the rollers would be large requiring a larger drive shaft 36 which would dramatically increase the cost of the wind turbine 10. To make this arrangement more cost effective, a second rear bearing 40 is used to assist the front bearing 38 in carrying the bending moment. Preferably, the rear bearing 40 is a cylindrical type bearing.

By properly spacing the bearings 38, 40 the forces generated by the blades 18 can be carried while minimizing the size of the drive shaft 36. In the preferred embodiment, the front bearing 38 and the rear bearing 40 are spaced apart a distance equal to the diameter of the drive shaft 36. Between the bearings 38, 40, the generator rotor 52 is mounted via a hub 54. The rotor 52 rotates inside the housing 34 adjacent to the stator 56. The rotor has electrical coils which are energized with direct current, creating a magnetic field. As the shaft 36 is driven by the blades 18, the rotor 52 rotates a magnetic field which induces electrical current in the stator 56. The electrical current flows from the stator 56 through cable 58 to power electronics 32 in the nacelle 14.

In order to provide electric current to the generator rotor 56, a slip ring assembly 42 is provided at the end of the drive shaft. The slip ring assembly 42 is mounted to the bedplate 22 by strut 43, which prevents rotation of the housing of the slip ring assembly 42 relative to the shaft 44. Mounted on the slip ring assembly is a speed sensor 60, which measures the rotational speed of the shaft 44. Further along the shaft, a disk 46 is mounted to the shaft 36 adjacent to the housing 34. For reasons that will be made clearer herein, the disk 46 interacts with a brake 48 which is used to slow the turbine blades. The brake 48 may be of any conventional type such as caliper actuated by hydraulic, pneumatic or electrical pressure. In the preferred embodiment, the disk 46 and brake 48 are positioned in a recess 50 in the housing 34. The shaft 36 terminates in a flange 44 to which the nose cone 16 mounts.

In operation, the turbine controller 62 receives information from wind direction sensor 00 indicating the direction of the wind. If the blades 18 are not oriented correctly with the respect to the wind, the wind turbine controller 62 activates and powers a yaw drive 26 powers a motor which drives the gear 28 to rotate the nacelle 14 and blades 18 to the correct position. If there is sufficient wind to drive the blades 18, typically 4–25 meters per second, the rotation of the blades 18 will turn the shaft 36 and the rotor 52 to generate the electrical current as described herein above. The wind turbine controller 62 periodically checks the wind direction, typically once multiple times per second.

Since over speeding of the wind turbine 10 due to excessively high wind speeds could damage the generator, it is desirable to have a means for slowing down the blades 18 and the shaft 36. Unlike in a variable pitch turbine which has blades that can be rotated to reduce the amount of lift generated on the blades, the blades 18 of the preferred embodiment are of a fixed pitch. The aerodynamic design of the fixed-pitch blades causes stall at higher wind speeds to reduce lift, provided the rotational speed of the blade rotor is limited. The speed is controlled under normal conditions by adjusting the generator torque using the power converter or the rotor current. In the event that an over speed condition occurs, two independent braking systems are normally applied, both with the capability to stop the rotor. The first system is an electrical dynamic brake, which uses a resistor to dump energy and create a high torque on the generator 20. The second system uses a mechanical brake 48 to slow the blades 18. In the event that an over speed condition is detected by speed sensor 60 or alternatively by a rotary encoder (not shown) located adjacent the slip rings down-wind of the main shaft, the caliper 49 on the brake 48 is actuated causing the caliper 49 to contact the disk 46. The resulting friction between the brake 48 and the disk 46 causes the shaft to decrease in speed. By locating the brake in the recess 50 of the generator 20, room is saved in the nacelle 14 without risking contamination of the generator 20 components. Potential contamination is further reduced by placing this recess on the down-wind side of the generator 20.

While the invention has been described with reference to a preferred embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A wind turbine comprising:
   a tower having a yaw bearing attached at a top end having an open portion therein;
   a nacelle having a bedplate connected to said yaw bearing; and,
   a transformer suspended within said tower open portion below said nacelle.

2. The wind turbine of claim 1 wherein said transformer is coupled to said bedplate.

3. The wind turbine of claim 2 wherein said transformer is coupled to said bedplate by a chain.

4. The wind turbine of claim 3 wherein said transformer is in contact with said tower.

5. The wind turbine of claim 3 wherein said transformer is in contact with a viscous fluid in a container attached to said tower.

6. The wind turbine of claim 2 wherein said transformer has an outer diameter and an inner diameter, said inner diameter being sized to allow access from said tower to said nacelle.

7. A wind turbine comprising:
   a nacelle having a bedplate;
   a tower having an anchored end;
   a bearing means coupled to said tower opposite said anchored end;
   a bedplate coupled to said bearing means;
   a suspension means coupled to said bedplate; and,
   a transformer coupled to said suspending means.

8. The wind turbine of claim 7 wherein said bearing means is a yaw bearing.

9. The wind turbine of claim 8 further comprising a nacelle coupled to said bedplate.

10. The wind turbine of claim 9 further comprising rotation means for rotating said bedplate to orient the nacelle relative to a wind direction.

11. The wind turbine of claim 10 wherein said rotation means is a yaw drive mounted inside said nacelle and a pinion coupled to said yaw drive.

12. The wind turbine of claim 11 wherein yaw bearing includes gear teeth on the outer race of said yaw bearing.

13. The wind turbine of claim 12 wherein said pinion engages said yaw bearing gear teeth.

14. A wind turbine comprising:
   a nacelle having a bedplate;
   a wind sensor mounted to said nacelle;
   a controller mounted within said nacelle and operable coupled to receive a signal from said wind sensor;
   a yaw drive within said nacelle and operably coupled to said controller;
   a yaw bearing mounted to said bedplate and operably coupled to said yaw drive;
   a tower coupled to said yaw bearing opposite said bedplate; and,
   a transformer suspended below said bedplate within said tower.

15. The wind turbine of claim 14 further comprising a pinion coupled between said yaw drive and said yaw bearing.

16. The wind turbine of claim 14 wherein said transformer includes an opening of suitable size to allow personnel access to the nacelle.

17. The wind turbine of claim 16 wherein said transformer is coupled to said bedplate by a flexure means for compensating for vibratory movement of the wind turbine.

18. The wind turbine of claim 17 wherein said tower has an inner diameter sized to allow said transformer to be positioned within said tower.

19. The wind turbine of claim 18 further comprising a gap between said transformer and said tower inner diameter, said gap being sized to allow said transformer to contact said tower inner diameter under the vibratory movement of the wind turbine.

* * * * *